United States Patent
Graffin

(10) Patent No.: US 9,044,885 B2
(45) Date of Patent: Jun. 2, 2015

(54) DEVICE FOR BLOW-MOLDING CONTAINERS

(71) Applicant: SERAC GROUP, Le Ferte Bernard (FR)

(72) Inventor: Andre Graffin, Winfield, IL (US)

(73) Assignee: Serac Group, La Ferte Bernard (FR)

( * ) Notice: Subject to any disclaimer, the term of this patent is extended or adjusted under 35 U.S.C. 154(b) by 0 days.

(21) Appl. No.: 13/919,730

(22) Filed: Jun. 17, 2013

(65) Prior Publication Data

US 2014/0030373 A1  Jan. 30, 2014

(30) Foreign Application Priority Data

Jun. 19, 2012 (FR) .................................... 12 55753

(51) Int. Cl.
*B29C 49/36* (2006.01)
*B29C 49/48* (2006.01)
*B29C 49/56* (2006.01)

(52) U.S. Cl.
CPC ................ *B29C 49/36* (2013.01); *B29C 49/56* (2013.01); *B29C 49/48* (2013.01); *B29C 2049/4864* (2013.01); *B29C 2049/4892* (2013.01)

(58) Field of Classification Search
CPC  B29C 49/36; B29C 49/48; B29C 2049/4864; B29C 2049/4892; B29C 49/56
USPC .......................................... 425/535, 540, 541
See application file for complete search history.

(56) References Cited

U.S. PATENT DOCUMENTS

| | | | | |
|---|---|---|---|---|
| 3,782,879 | A * | 1/1974 | Mnilk et al. | 425/450.1 |
| 4,310,282 | A * | 1/1982 | Spurr et al. | 425/533 |
| 4,850,850 | A * | 7/1989 | Takakusaki et al. | 425/526 |
| 5,411,391 | A * | 5/1995 | Albrecht et al. | 425/451.9 |
| 6,116,888 | A * | 9/2000 | Johnston et al. | 425/195 |
| 6,709,611 | B1 * | 3/2004 | Emmer et al. | 264/37.16 |
| 8,770,967 | B2 * | 7/2014 | Graffin | 425/541 |
| 2009/0039567 | A1 | 2/2009 | Linke et al. | |
| 2009/0065980 | A1 * | 3/2009 | Baumgarte et al. | 264/503 |
| 2010/0203185 | A1 | 8/2010 | Litzenberg et al. | |

FOREIGN PATENT DOCUMENTS

| | | |
|---|---|---|
| DE | 202004017530 | 4/2005 |
| DE | 102005034541 | 2/2007 |

* cited by examiner

*Primary Examiner* — Robert B Davis
(74) *Attorney, Agent, or Firm* — Muncy, Geissler, Olds & Lowe, P.C.

(57) ABSTRACT

A device for blow-molding containers including a structure and a platform mounted to rotate on the structure about an axis of rotation. The platform is provided with blower members and with molds that are mounted under the blower members, each of which includes a stationary mold portion and a movable mold portion that is movable in pivoting by a control device between an open position and a closed position for the mold. The device includes blocking members for blocking the molds in the closed state, each blocking member including a strut.

13 Claims, 7 Drawing Sheets

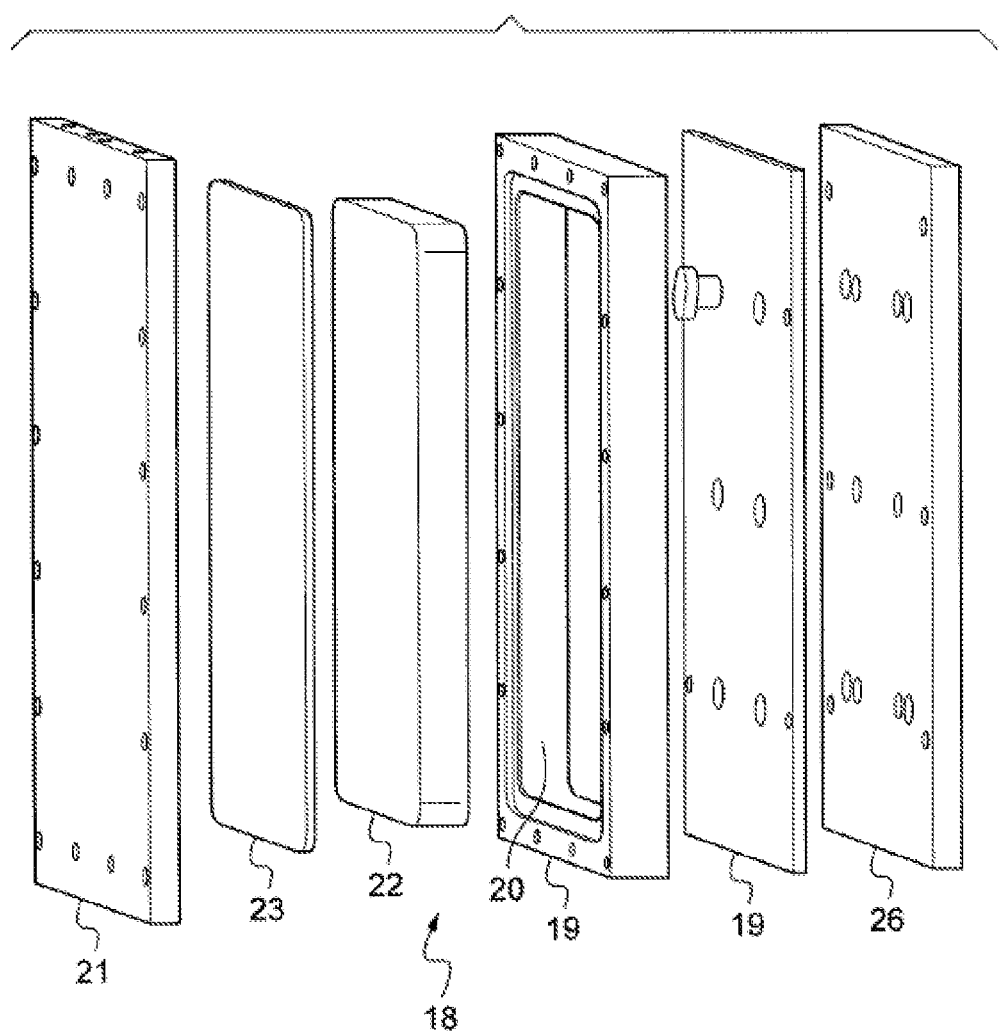

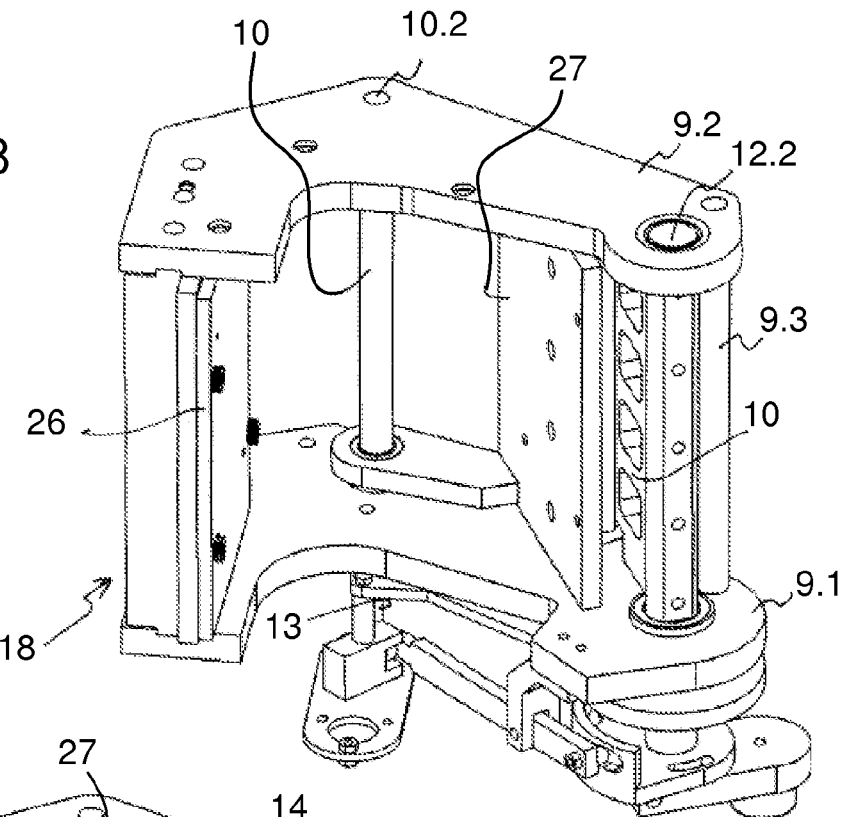

DEVICE FOR BLOW-MOLDING CONTAINERS

The present invention relates to a device for blow-molding containers. Such a device is generally designed to be installed in a line for producing packages that are intended in particular to contain liquids.

A blow-molding device generally comprises a structure and a platform mounted to rotate on the structure about an axis of rotation. The platform is provided on its periphery with blower members and with molds mounted under the blower members. The device also includes control means for moving the molds between an open state and a closed state, a transporter for loading preforms into each of the molds, and a transporter for removing containers that have been blow-molded on the platform. Loading, blow-molding, and removal are performed in zones of the platform through which each mold passes in succession during the rotation of the platform. By way of example, the transporters comprise transfer stars and/or rectilinear transporters.

There exist molds that are constituted by two movable portions that are hinged to each other to move between a mold-open position and a mold-closed position. The mold is held in the closed position by means of a locking pin that is of dimensions suitable for co-operating with the hinge pin between the mold portions to withstand the blow-molding forces.

There also exist molds that comprise a stationary portion with a movable portion that is hinged thereto. The control means for moving the movable portion between the closed and open positions comprise two links connected to each other to form a toggle that also serves to hold the movable portion in its closed position. The toggle is connected to the movable mold portion at the side thereof that is opposite the hinge pin of the mold portions.

Blow-molding is performed at a pressure of several tens of bars, conventionally forty bars, thereby giving rise to large forces on the molds, the hinges, and the mechanisms for holding the molds in the closed state. The molds and their holding mechanisms thus comprise parts that are bulky in order to withstand such forces. Nevertheless, the forces contribute to premature wear of the hinges of the movable portions of the molds and of the holding mechanisms, which wear makes it necessary to provide devices for taking up slack. The overall amount of wear is increased by the means for holding the mold in the closed position being complex and having a large number of hinges.

The complexity of the holding means therefore has an influence on maintenance costs and also contributes to the overall size and weight of the platform, thereby increasing its inertia.

An object of the invention is to provide a device that is simpler and that presents a longer lifetime.

To this end, the invention provides a device for blow-molding containers, the device comprising a structure and a platform mounted to rotate on the structure about an axis of rotation, the platform being provided with blower members and with molds that are mounted under the blower members, each of which comprises a stationary mold portion and a movable mold portion that is movable in pivoting by control means between an open position and a closed position for the mold. The device includes blocking members for blocking the molds in the closed state, each blocking member comprising a strut that is connected to the movable mold portion by at least one link and that is secured to a pivot shaft mounted on the platform to move between a retracted position and a blocking position in which the strut is in contact with a surface secured to the movable mold portion, the pivot shaft being positioned in such a manner that in the closed position the strut extends in a direction along which a resultant of the blow-molding force as taken up by the movable mold portion is applied.

Thus, the force for keeping the mold closed is supported by the strut and taken up by the pivot shaft positioned in such a manner that the strut is in alignment in the direction along which the resultant of the blow-molding forces taken up by the movable mold portion is applied, and that said resultant intersects the axis of the pivot shaft. This enables a maximum amount of blow-molding force (and thus of force holding the mold closed) to be transmitted, and directed to the abutment element, without generating interfering moment on the strut and the pivot shaft that may then be dimensioned as a result of simple calculations. This also makes it possible to limit the forces that need to be withstood by the hinges of the mold portions, thereby enabling their lifetime to be lengthened and the structure to be made lighter. The pivot shaft of the strut works in shear, such that the forces that it must withstand are easily calculated, thereby making the pivot shaft even simpler to dimension. The link makes it possible to synchronize the movements of the strut and of the movable mold portion and limits the risk of impacts between these two elements. The link also makes it possible to provide a single control to enable the strut and the movable mold portion to be moved in synchronized manner.

In a particular embodiment, the strut, the link, the movable mold portion, and the pivot shaft are positioned in such a manner that the strut is in contact with the surface of the movable mold portion beyond a position in which the hinged ends of the link are in alignment with the pivot shaft.

By way of example, this is obtained by offsetting the hinge of the link relative to the axis of the strut. It is thus ensured that the strut is applied on the movable mold portion without forcing the hinges of the link and without stress being taken up by the link when the strut is in the blocking position.

Preferably, the surface of the movable mold portion and the face of the strut pressing thereagainst are inclined in order to avoid interference between them before they reach the blocking position.

According to a particular characteristic, the mold portions, the strut, the pivot shaft, and at least one portion of the control means are mounted in a frame that is fastened on the platform.

Thus, the frame serves to take up the blow-molding forces without them being transmitted to the platform. By means of the frame, a mold module is likewise made up that incorporates the mold and its control means and that can be fitted as a unit on the platform. Operations of assembling and adjusting the molds may be performed in a workshop, the mold modules then being mounted on the installation. This enables mold changing to be accelerated when passing from fabricating a first series of containers to another series of containers having a different shape, and limits the down time of the installation. In addition, it is possible to provide an installation having different configurations concerning the number of mold modules, e.g. as a function of the bulkiness of the molds. In one configuration, by way of example, the platform comprises half as many mold modules mounted under every other blower member.

Advantageously, the strut is of a height that is substantially identical to a height of the mold.

The blow-molding force is thus taken up by the strut over the entire height of the movable mold portion, thereby distributing the force in uniform and limiting any risk of stress concentration zones appearing, which would otherwise constitute sources of premature wear in the movable mold portion and/or the strut.

According to a particular characteristic, the stationary mold portion is mounted on a presser element for pressing the stationary mold portion against the movable mold portion and, preferably, the presser element comprises a body provided with a chamber slidably receiving a piston to slide in a direction parallel to the direction in which the resultant of the blow-molding force is applied, the piston being subjected to blow-molding pressure and the stationary mold portion being secured to in translation with the piston.

The stationary mold portion is thus pressed against the movable mold portion and causes it to press firmly against the strut. This pressure is obtained in simple manner by means of the blow-molding pressure, it being understood that the piston is of a section such that the force that results from applying pressure thereto is at least greater than the blow-molding force acting on the mold.

Other characteristics and advantages of the invention appear on reading the following description of a particular, non-limiting embodiment of the invention.

Reference is made to the accompanying drawings, in which:

FIG. 7 is an exploded diagrammatic view in perspective of means for pressing the stationary mold portion against the movable mold portion;

FIG. 8 is a perspective view of the mold module without the mold with the control means in the open position;

FIG. 9 is a perspective view of the mold module without the mold with the control means in the closed position;

Figure 1:
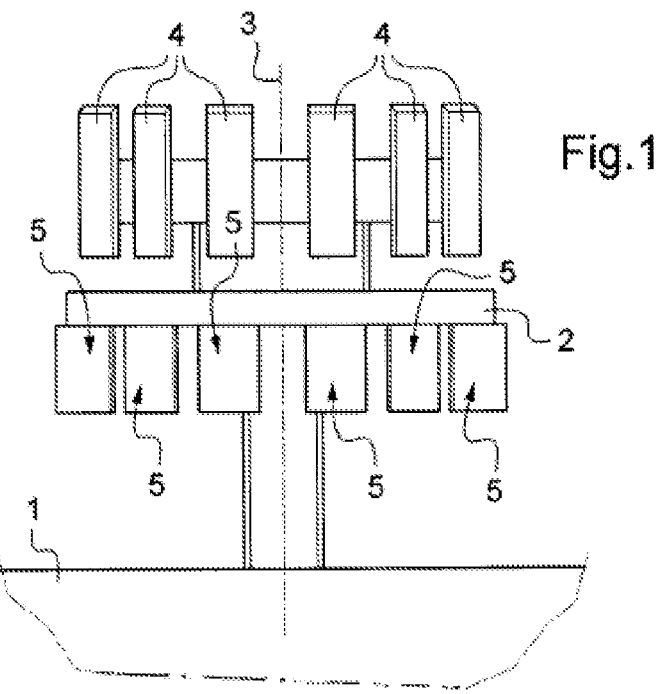
FIG. 1 is a diagrammatic elevation view of a device in accordance with the invention.

The device for blow-molding containers in this example is for fabricating bottles with threaded necks. The bottles are fabricated from preforms that are inserted into molds prior to air being blown into the insides of the preforms in order to inflate them and form the bodies of bottles by pressing the preforms against the walls of the molds. The blow-molding method is itself known and is not described in greater detail herein.

With reference to the figures, the device of the invention, comprises a structure 1 and a platform 2 mounted to rotate on the structure 1 about an axis of rotation 3.

The platform 2 is provided with blower members 4 that are themselves known and with molds given overall reference 5 that are mounted beneath the blower members 4.

Each mold 5 comprises two mold portions, namely a stationary mold portion 6 and a movable mold portion 7 together with a bottom 8. Each mold portion 6, 7 includes a cavity corresponding to half of the outside shape of the body of the bottle, the bottom 8 including a cavity corresponding to the bottom of the bottle.

The mold portions 6, 7 are mounted between a bottom plate 9.1 and a top plate 9.2 forming a frame, and the bottom 8 is mounted under the bottom plate 9.1. The plates 9.1 and 9.2 are horizontal and connected to each other by a vertical column 9.3 forming a spacer and by various other elements mentioned below.

The movable mold portion 7 is secured to a support 27 having one side secured to a shaft 10 having bottom and top end portions 10.1 and 10.2 pivotally received in the plates 9.1 and 9.2, respectively. The movable mold portion 7 thus pivots between a closed position (FIGS. 6, 9, 11, and 12) in which it extends facing the stationary mold portion 6, and an open position (FIGS. 3, 4, and 8) in which it is spaced apart from the stationary mold portion 6 so as to enable the preform to be inserted into the mold 5 and so as to enable the blow-molded bottle to be extracted from the mold 5.

The movable mold portion 7 is associated with a member for blocking it in the closed position. The blocking member comprises a strut 11 having an end 11.1 secured to a pivot shaft 12 and an end 11.2 connected to the movable mold portion 7 via links 14. The pivot shaft 12 has a bottom end portion 12.1 and a top end portion 12.2 that are pivotally received in the bottom plate 9.1 and in the top plate 9.2, respectively. The strut 11 is thus movable between a retracted position (FIGS. 3, 4, and 8) and a blocking position (FIGS. 6, 9, 10, and 11). In the blocking position the strut 11 has a face 11.3 that presses against a surface 27.1 of the support 27 of the movable mold portion 7 and extends between the movable mold portion 7 and the pivot shaft 12 that forms an abutment element secured to the platform 2 in a position such that the strut 11 in the blocking position extends along a direction F (FIG. 6) for applying a resultant of the blow-molding force taken up by the movable mold portion 7. In the retracted position, the strut 11 extends outwards from the platform 2 in a substantially radial direction relative to said platform 2. The strut 11 is thus of a height that is substantially equal to the height of the movable mold portion 7. It should be observed that the support 27 is arranged so as to enable the strut 11 to bear thereagainst and so as to enable it to take up the blow-molding forces.

Figure 6:
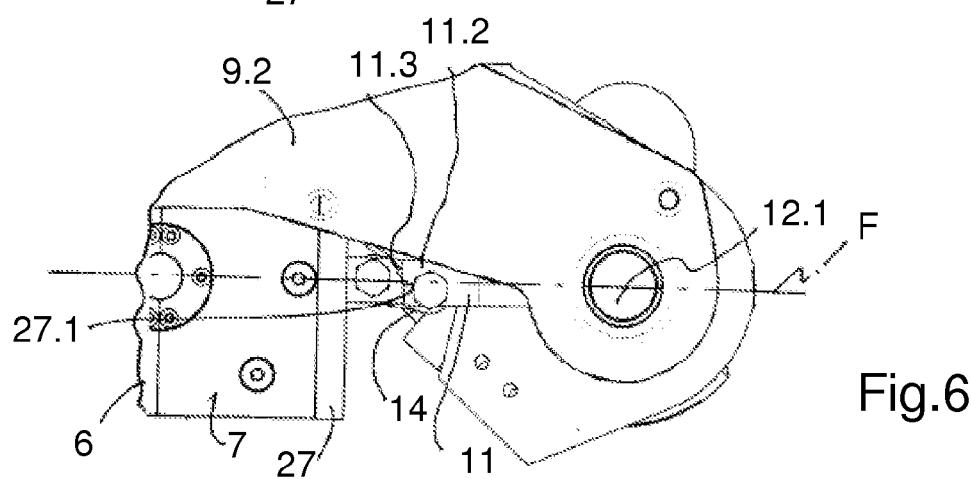
FIG. 6 is a fragmentary plan view of a mold module with the mold closed.
Figure 10:
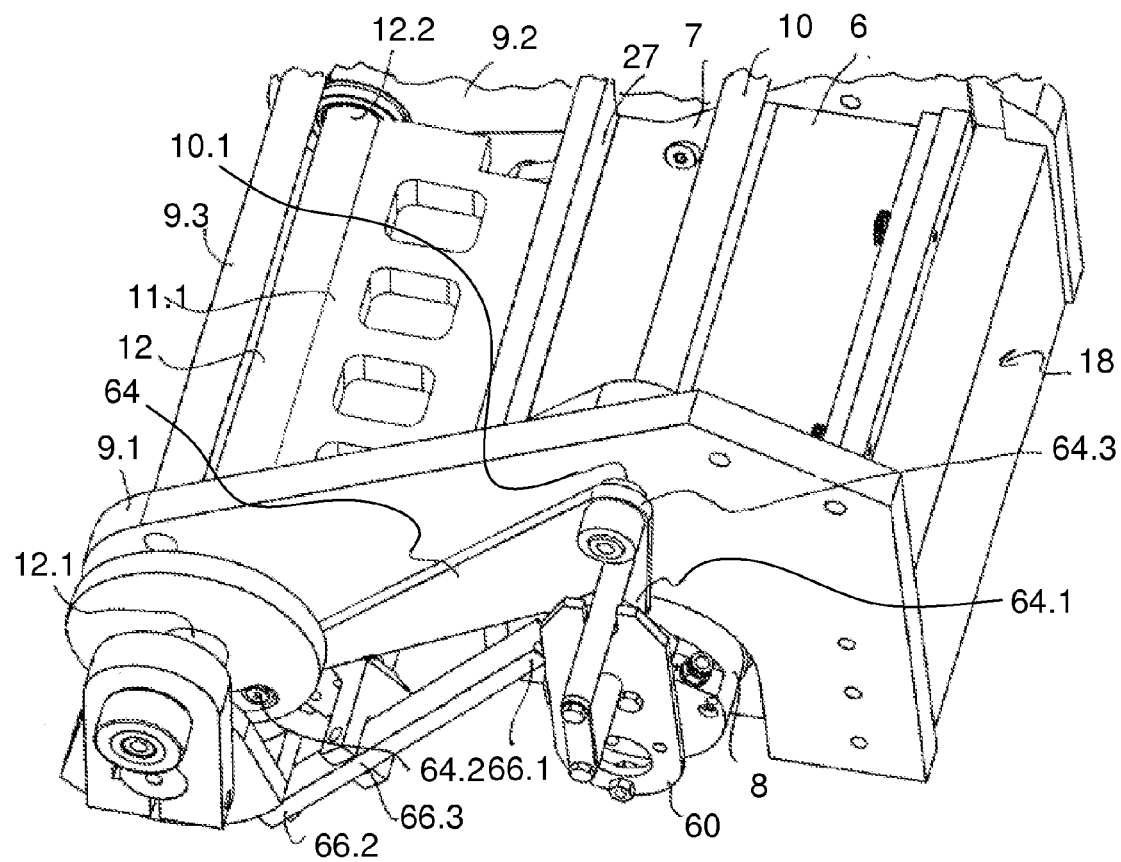
FIG. 10 is a plan view of the mold module with the mold in the closed position.
Figure 11:
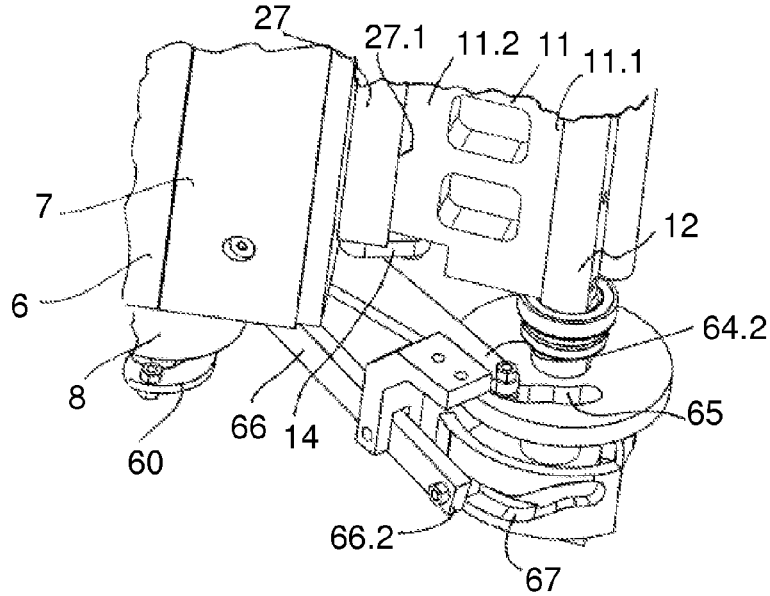
FIG. 11 is a detail view of a portion of the control means of the mold when said mold reaches the closed position.
Figure 12:
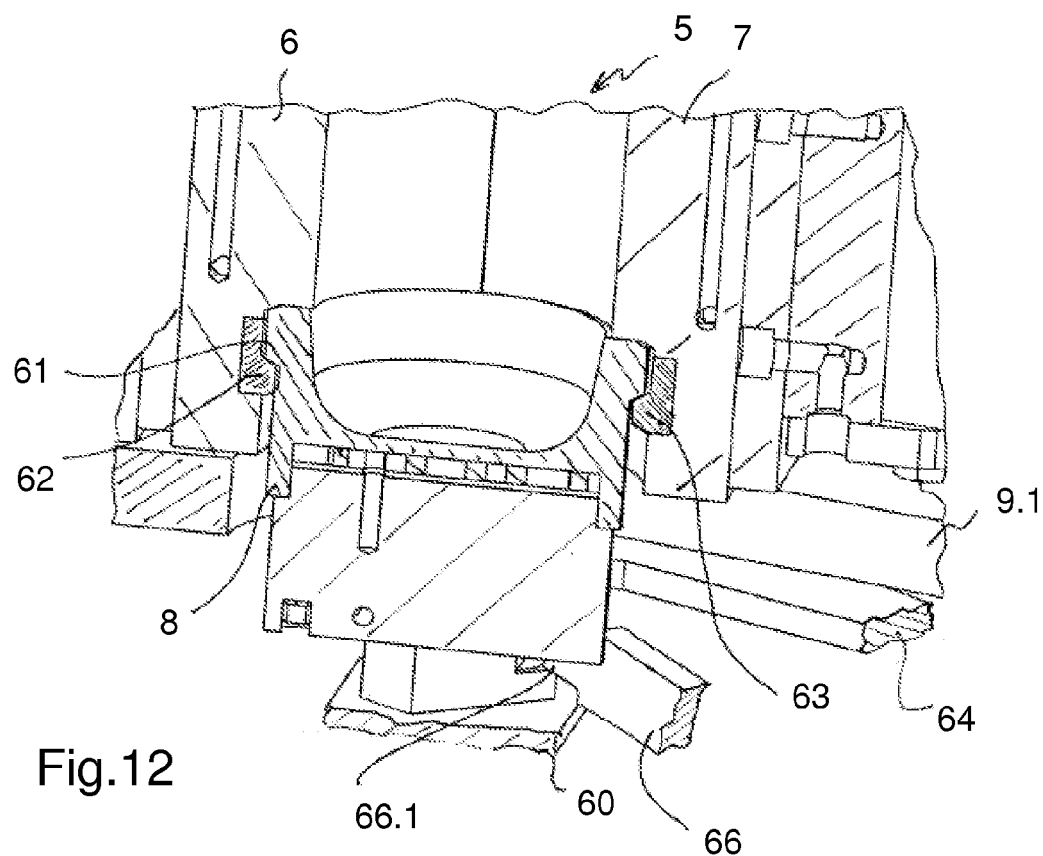
FIG. 12 is a fragmentary view in axial section of the mold in the closed position.

It should also be observed that the strut 11, the links 14, the movable mold portion 7, and the pivot shaft 12 are positioned in such a manner that the face 11.3 of the strut 11 is in contact with the surface 7.1 of the movable mold portion 7 beyond a position of alignment of the hinged ends of the links 14 with the pivot shaft 12 (see FIG. 6 in particular). In addition, the surface 27.1 of the movable mold portion 7 and the face 11.3 of the strut 11 that presses thereagainst are slightly inclined in order to facilitate the movement of the strut from its blocking position towards its retracted position by limiting the risk of interference between said surfaces. This procures gentle operation that prevents impacts and noise during operation of the installation.

Figure 3:
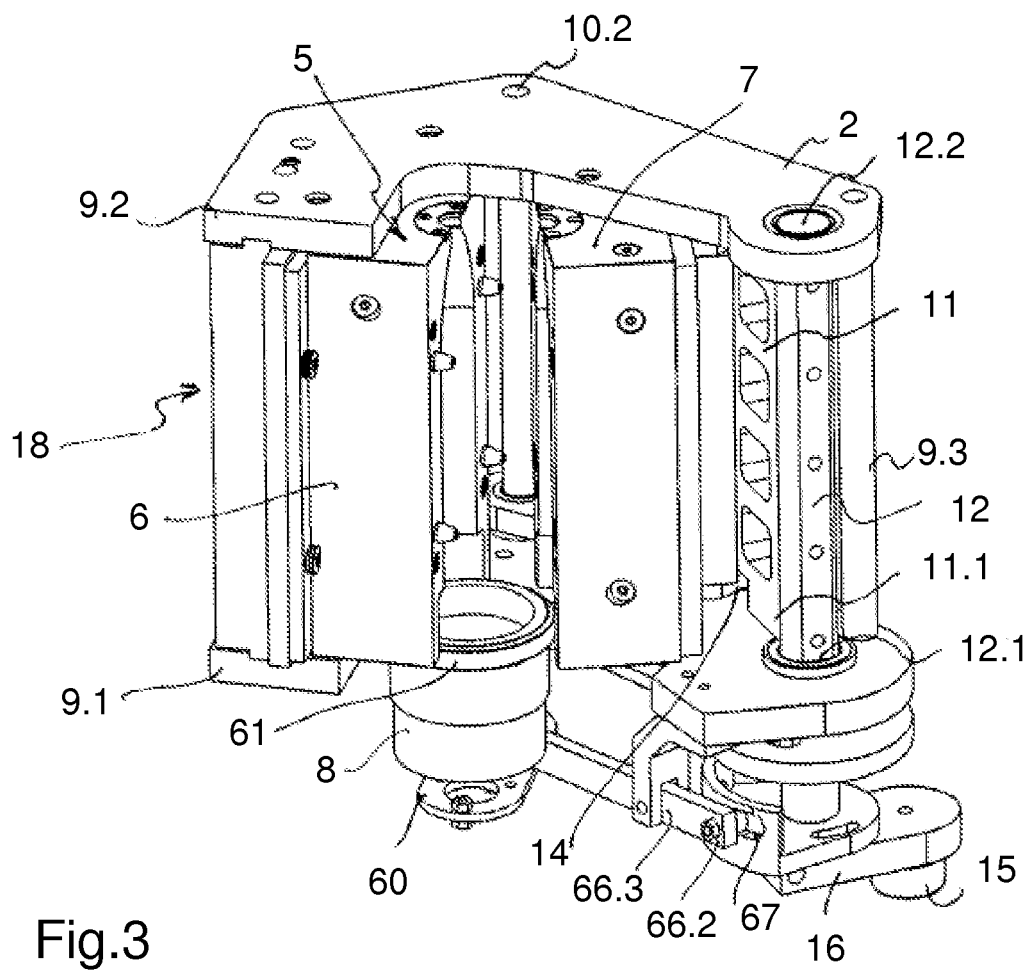
FIG. 3 is a detail view of a mold module in accordance with the invention.
Figure 2:
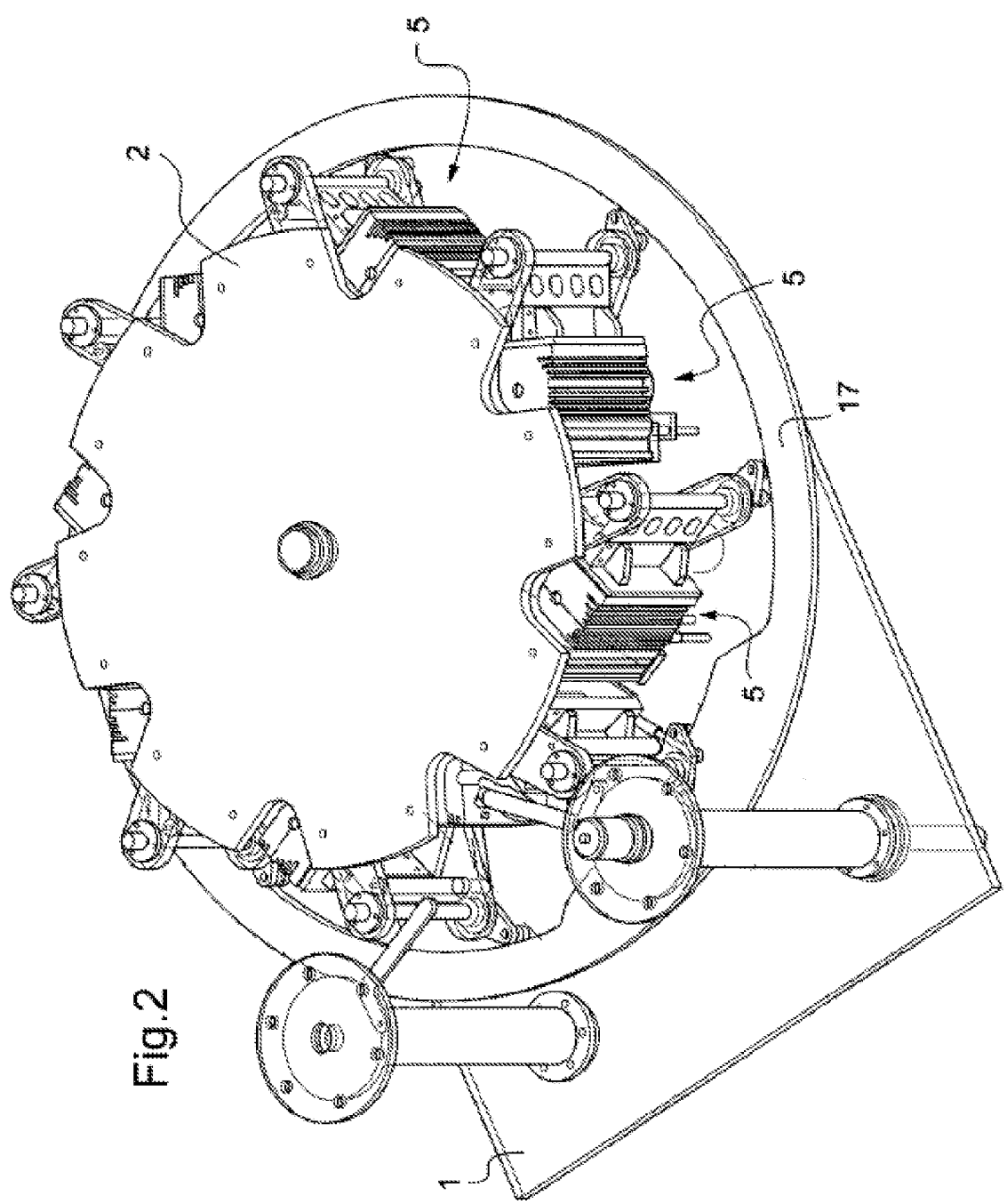
FIG. 2 is a fragmentary diagrammatic view in perspective of the platform of the device.
Figure 4:
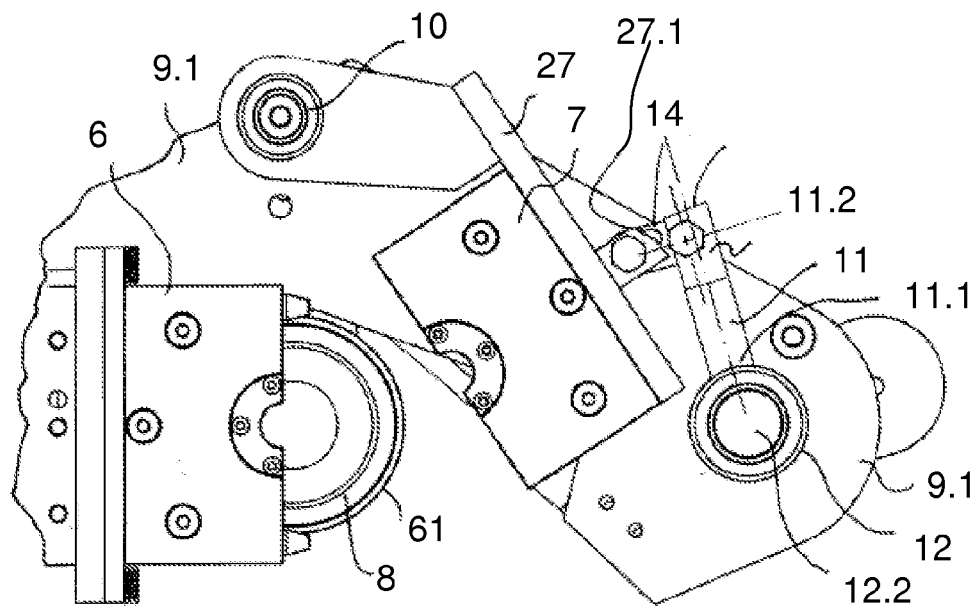
FIG. 4 is a fragmentary plan view of a mold module with the mold open.
Figure 5:
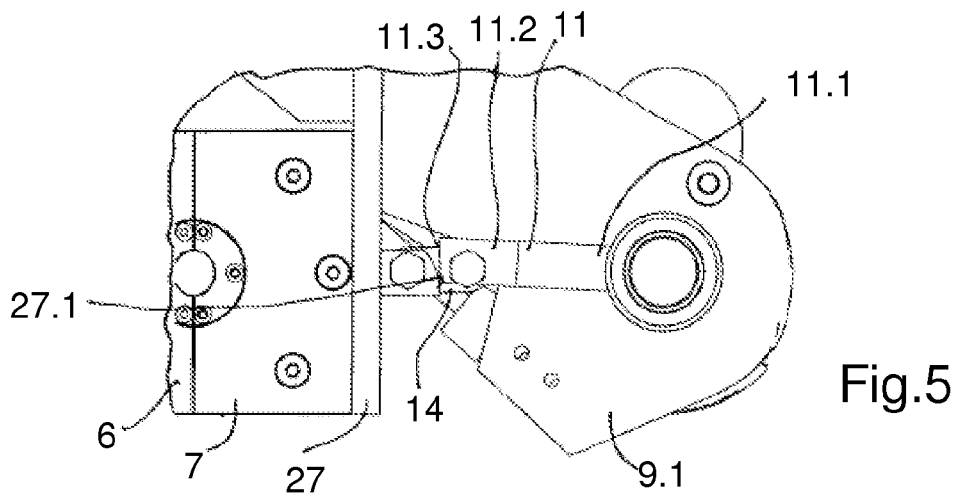
FIG. 5 is a fragmentary plan view of a mold module with the mold closing.

The mold bottom 8 is mounted on the support 60 that is mounted to slide along a column 13 between a closed position in which the bottom 8 is engaged between the mold portions 6, 7 (FIGS. 9 to 12) and an open position in which the bottom 8 is disengaged from the mold portions 6, 7 (FIGS. 3 and 8).

The bottom 8 is provided with an abutment 61 designed to co-operate with an inwardly-projecting abutment 62, 63 respectively of the stationary mold portion 6 and of the movable mold portion 7. In this example, the abutment 61 is formed by an outwardly-projecting rim of the bottom and the abutments 62, 63 are formed by respective inwardly-projecting steps of the mold portions 6, 7 in order to support the rim forming an abutment 61.

When the movable mold portion 7 is in the open position, the mold bottom 8 in the engaged position is movable horizontally between a locked position in which the abutment 61 of the bottom 8 is in relative engagement with the abutments 62, 63 of the mold portions 6, 7 in order to impede movement of the bottom 8 into the disengaged position, and an unlocked position in which the abutment 61 escapes from the abutments 62, 63 making it possible to move the bottom 8 between the engaged position and the disengaged position.

The platform 2 is provided with control means for controlling:

the mold portions 7 that are movable between their closed and open positions; and the struts 11 between their retracted positions and their blocking positions.

The control means comprise a wheel 15 mounted on a crank 16 secured to the pivot shaft 12 in such a manner that the wheel 15 co-operates with a cam 17 that is stationary relative to the structure 1 and that is shaped to move the movable mold portion 7 and the strut 11 into their two positions.

More precisely, the movement of the wheel 15 drives pivoting of the pivot shaft 12 and the strut 11 that is secured thereto, as well as movement of the movable mold portion 7 that is driven via the links 14 by the strut 11. The links 14 serve to synchronize the movements of the movable mold portion 7 between its open position and its closed position with the movements of the strut 11 between its retracted position and its blocking position in such a manner that, immediately after the movable mold portion 7 has reached its closed position, the strut 11 reaches its blocking position, and when the strut 11 is taken towards its retracted position, the movable mold portion 7 is taken towards its open position.

The cam 17 is fastened to the housing 1 and extends around the platform 2 in order to move the crank 15 into its positions corresponding to the retracted and blocking positions of the strut 11, and therefore into the open and closed positions of the movable mold portion 7. The cam 17 is arranged to open the molds in a zone for loading preforms into the molds 5 and for unloading blow-molded bottles from the molds 5, and to close the molds 5 and keep them closed when, as a result of the platform 2 rotating, the molds 5 are no longer in the loading and unloading zone.

The platform 2 is provided with control means for controlling movement of the bottom 8 between its open position and its closed position.

The bottom of the mold is mounted in of manner on the support 60 that slides along the column 13. The column 13 is fastened to a bell crank 64 for controlling horizontal movement having a first end 64.1 fastened to the support 60, an intermediate portion 64.3 (at its bend) mounted on the bottom end 10.1 of the pin 10 in order to pivot about a substantially vertical axis, and a second end 64.2 provided with a vertical-axis wheel received in a cam path 65 that is constrained to rotate with the pivot shaft 12 of the strut 11. The cam path 65 is defined to move the second end 64.2 horizontally in such a manner as to move the support 60 between the locked position and the unlocked position when the bottom of the mold 8 is in the closed position and the movable mold portion 7 is in the open position.

The control means further comprise a control lever 66 for controlling vertical movement of the bottom of the mold 8. The lever 66 has an end 66.1 hinged onto the support 60 of the mold bottom 8 and an end 66.2 provided with a horizontal-axis wheel received in a cam path 67 that is constrained to rotate with the pivot shaft 12 of the strut 11. The cam path 67 is defined in such a manner that when the strut 11 is in its retracted position, the mold bottom 8 is in its open position and, when the strut 11 is in its blocking position, the mold bottom 8 is in its closed position.

The cam paths 65 and 67 are positioned angularly relative to each other on the shaft 12 in such a manner that:

during movement of the strut 11 from its retracted position towards its blocking position, the mold bottom 8 is brought to the closed position and then to the locked position before the strut 11 reaches the blocking position and the movable mold portion 7 reaches the closed position; and during movement of the strut 11 from its blocking position towards its retracted position, the strut 11 leaves its blocking position and the movable mold portion 7 leaves its closed position before the mold bottom 8 is brought to the unlocked position and then to the open position.

The stationary mold portion 6 is mounted in a presser element, given overall reference 18, for pressing the stationary mold portion 6 against the movable mold portion 7. The presser element 18 is mounted between the plates 9.1, 9.2 that it contributes to spacing apart and comprises a body 19 defining a chamber 20 that is closed at one end by an end wall 21 and that slidably receives a piston 22 having a fastener plate 26 fastened thereto for fastening to the stationary mold portion 6. The sliding direction of the piston 22 is parallel to the direction in which the resultant of the blow-molding force is applied, and the stationary mold portion 6 is constrained to move in translation with the piston 22. The end wall 21 has top and bottom edges received in grooves that are formed in the top and bottom plates 9.2 and 9.1. Between the body 19 and the end wall 21 there extends an elastically deformable diaphragm 23 having a peripheral edge that is pinched between the body 19 and the end wall 21. The end wall 21 is pierced by a channel for injecting air at the blow-molding pressure between the end wall 21 and the diaphragm 23 in such a manner that the air causes the diaphragm 23 and the piston 22 to move, and thus moves the stationary mold portion 6. The air injection channel is connected by a duct to the source of blow-molding air that feeds each of the blower members 4.

In operation, with the platform 2 rotating, the mold 5 is open in register with a member for putting a preform in the mold 5, and then once the preform has been loaded into the mold 5, the cam 17 causes the mold 5 to close by bringing the mold bottom 8 into the closed and locked position, bringing the movable mold portion 7 into its closed position, and bringing the strut 11 into its blocking position. The movement of the movable mold portions 7 between the open state and the closed state, are naturally synchronized with the movements of the bottoms 8 between their open and unlocked positions and their closed and locked positions.

Blow-molding air is then introduced into the mold 5 and simultaneously between diaphragm 23 and the end wall 21. The blow-molding air then causes the following:

the piston 22 to move so as to press the stationary mold portion 6 against the movable mold portion 7 that is blocked in position by the strut 11 (ensuring close contact of the surfaces 27.1 and 11.3); and the preform to be inflated so that its wall becomes pressed against the inside wall of the mold 5.

It should be observed that the stroke of the piston 22 is small since the function of the piston 22 is to eliminate clearance between the stationary mold portion 6 and the movable mold portion 7, and also between the movable mold portion 7 and the strut 11.

Blow-molding terminates when the mold 5 returns to the loading and unloading zone. The blow-molding pressure is disconnected beforehand. The cam 17 then causes the strut 11 to retract and the mold 5 to open. A clamp mounted at the end of an arm 11 then takes hold of the blow-molded bottle. The arm 25 is guided to cause the clamp 24 to move in an extraction direction enabling the blow-molded bottle to be taken out from the open mold 5 without interfering with the movable mold portion 7. The extraction movement is thus performed in a direction going away from the movable mold portion 7.

Figure 13:
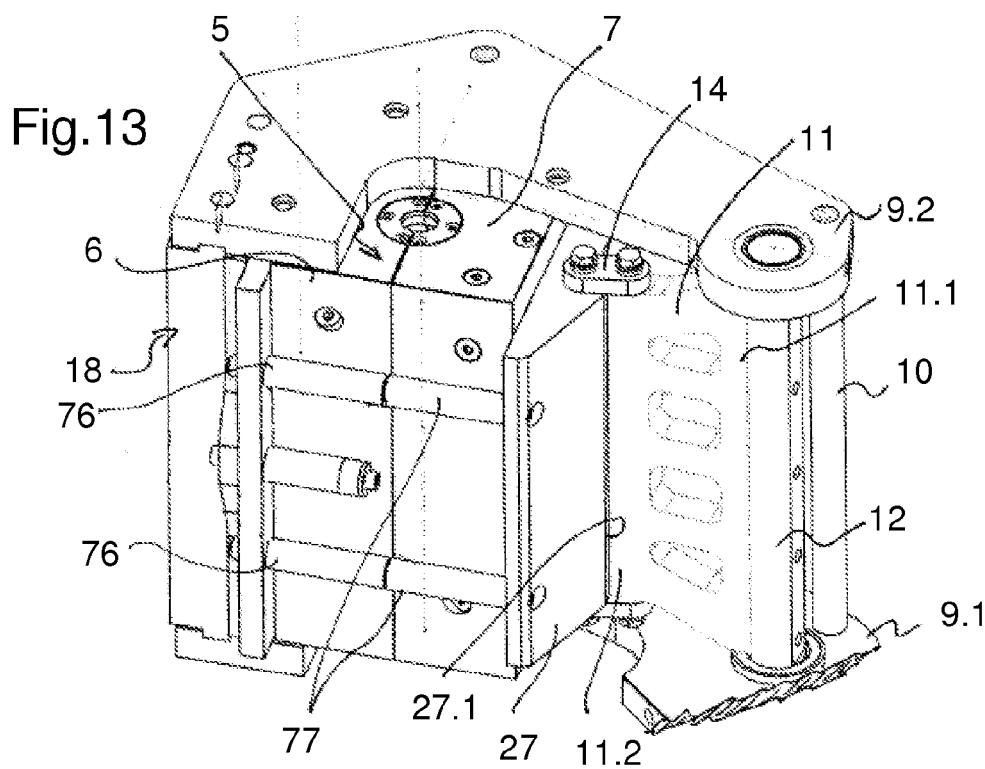
FIG. 13 is a fragmentary view in perspective of the mold module in a variant embodiment, the mold being in the closed position.

Advantageously, as shown in FIG. 13, the device of the invention includes abutments 76, 77 extending on either side of the mold portions 6, 7 to press against one another when the mold 5 is in the closed position. In this example, there are four abutments.

The abutments 76 extend on each side of the stationary mold portion 6 and they are secured to the fastener plate 26. The abutments 77 extend on each side of the movable mold portion 7 and they are secured to the support 27. In this example, the abutments 76, 77 have the shape of a flat-headed cylindrical pegs having lengths such that the abutments 76 are in contact with the abutments 77 when the mold 5 is in the closed position.

The abutments are made of a material having hardness that is greater than the hardness of the material (usually aluminum) that is used for the mold portions 6, 7, in such a manner as to avoid the faces of the molds deteriorating as a result of repeated closing of the mold.

Naturally, the invention is not limited to the embodiments described, but covers any variant coming within the ambit of the invention as defined by the claims.

In particular, the means for moving the struts between their two positions may comprise a servo-motor instead of a cam.

Furthermore, the means for causing the molds to move between their open and closed states may comprise one or more servo-motors instead of cams.

The control means for the struts and for the movable mold portions may be independent of one another.

The mold may comprise only a stationary portion and a movable portion.

The mold portions may be fastened directly to the platform.

The strut may slide between its two positions and it may be received in its blocking position between the movable mold portion and an abutment element secured to the platform or to a member that is itself secured to the platform.

The strut may thus bear against the movable mold portion either directly or indirectly, i.e. via an intermediate part.

The bottom 8 may tilt between its two positions instead, of sliding between said positions.

Although the arrangement of mold modules is particularly advantageous in this example, said arrangement is independent of the method of closing the mold and of the presence of a strut.

Although the locking of the mold bottom is particularly advantageous in this example, said locking is independent of the method of closing the movable mold portion 7 and of the presence of a strut.

The invention claimed is:

1. A device for blow-molding containers, the device comprising a structure (1) and a platform (2) mounted to rotate on the structure about an axis of rotation (3), the platform being provided with blower members (4) and with molds (5) that are mounted under the blower members, each of which comprises a stationary mold portion (6) and a movable mold portion (7) that is movable in pivoting by control means (12, 13) between an open position and a closed position for the mold, the device being characterized in that it includes blocking members for blocking the molds in the closed state, each blocking member comprising a strut (11) that is connected to the movable mold portion by at least one link and that is secured to a pivot shaft (12) mounted on the platform to move between a retracted position and a blocking position in which the strut is in contact with a surface secured to the movable mold portion, the pivot shaft (12) being positioned in such a manner that in the closed position the strut extends in a direction (F) along which a resultant of the blow-molding force as taken up by the movable mold portion is applied.

2. A device according to claim 1, wherein the strut, the link, the movable mold portion, and the pivot shaft are positioned in such a manner that the strut is in contact with the surface of the movable mold portion beyond a position in which the hinged ends of the link are in alignment with the pivot shaft.

3. A device according to claim 2, wherein the surface of the movable mold portion and the face of the strut pressing thereagainst are inclined in order to avoid interference between them before they reach the blocking position.

4. A device according to claim 1, wherein the control means comprise a wheel (16) mounted or a crank secured to the pivot shaft in such a manner that the wheel co-operates with a cam (17) that is stationary relative to the structure (1) and that is shaped to move the movable mold portion (7) and the strut (11) into their two positions by means of links (14).

5. A device according to claim 1, wherein the mold portions (6, 7) and the strut (11) are mounted in a frame (9) that is fastened on the platform (2).

6. A device according to claim 1, wherein the strut (11) is of a height that is substantially identical to a height of the mold (5).

7. A device according to claim 5, wherein the stationary mold portion (6) is mounted on a presser element (18) for pressing the stationary mold portion against the movable mold portion (7).

8. A device according to claim 7, wherein the presser element (18) comprises a body (19) provided with a chamber slidably receiving a piston (22) to slide in a direction parallel to the direction in which the resultant of the blow-molding force is applied, the piston (22) being subjected to blow-molding pressure and the stationary mold portion (6) being secured to move in translation with the piston.

9. A device according to claim 1, wherein each mold comprises a mold bottom movable in vertical translation between an engaged position between the mold portions and a disengaged position.

10. A device according to claim 9, wherein the control means comprise a control lever for controlling vertical movement having a first end hinged to the mold bottom, an intermediate portion mounted to pivot about a substantially horizontal axis, and a second end co-operating with a cam constrained in rotation to a pivot shaft of the strut in order to move the second end vertically.

11. A device according to claim 9, wherein the mold bottom in the engaged position is movable horizontally between a locked position in which an abutment of the mold bottom is in relative engagement with an abutment of the stationary mold portion it order to oppose movement of the mold bottom into a disengaged position, and an unlocked position in which the abutment of the mold bottom escapes from the abutment of the mold portion.

12. A device according to claim 10, wherein the mold bottom is mounted on a horizontal movable support between the locked position and the unlocked position and the control means comprise a horizontal control lever having a first end fastened to the support at an off-center point thereof, an intermediate portion mounted to pivot about a substantially vertical axis, and a second end co-operating with a cam constrained to rotate with the strut in order to move the second end horizontally.

13. A device according to any preceding claim, including abutments (76, 77) extending on either side of the mold portions (6, 7) to press against each other when the mold (5) is in the closed position.

* * * * *